UNITED STATES PATENT OFFICE.

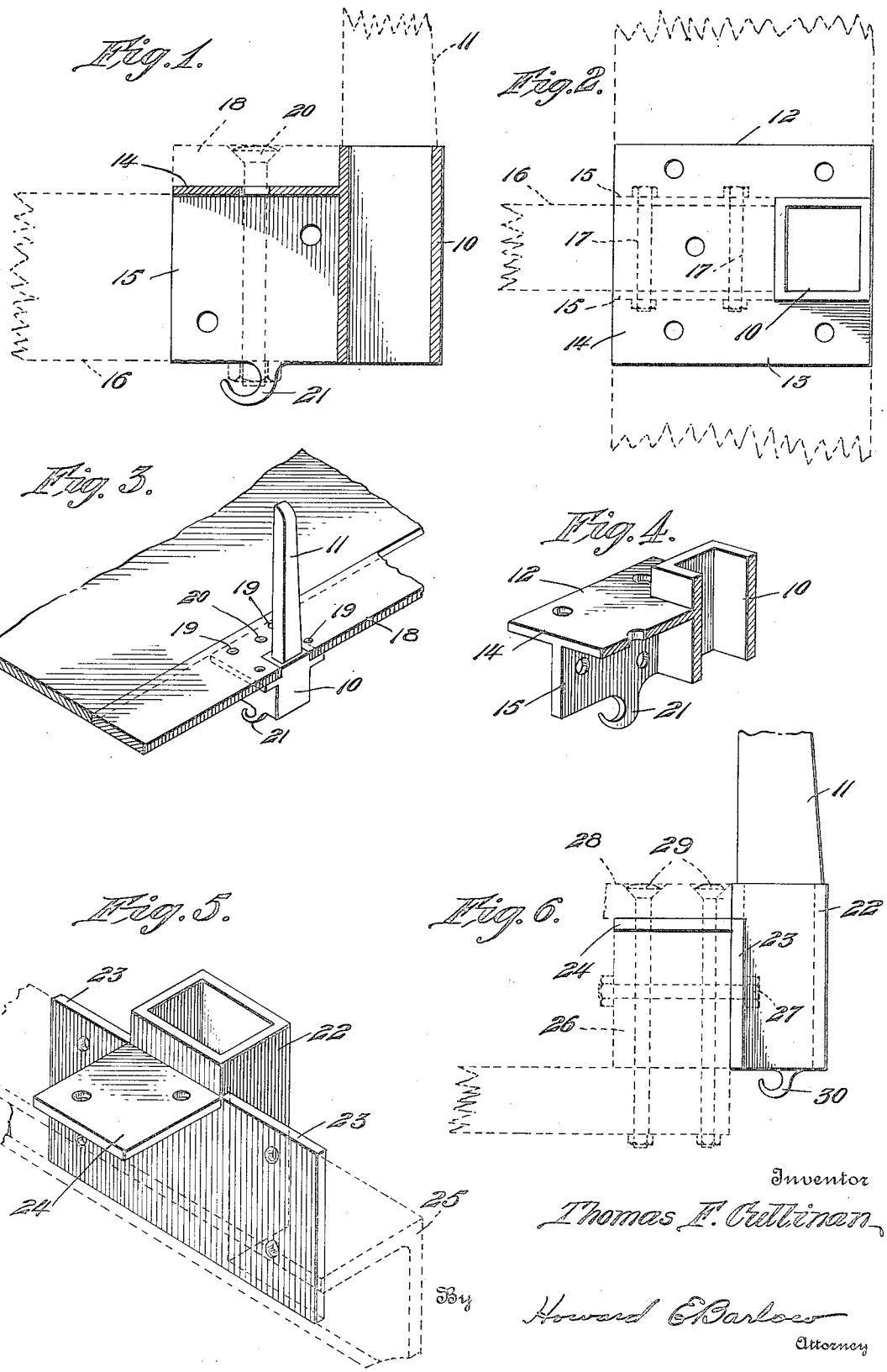

THOMAS F. CULLINAN, OF PROVIDENCE, RHODE ISLAND.

STAKE-HOLDING DEVICE.

1,383,986.  Specification of Letters Patent.  Patented July 5, 1921.

Application filed December 22, 1920. Serial No. 432,422.

*To all whom it may concern:*

Be it known that I, THOMAS F. CULLINAN, a citizen of the United States and resident of Providence, in the county of Providence and State of Rhode Island, have invented certain new and useful Improvements in Stake-Holding Devices, of which the following is a specification.

This invention relates to an improved stake-holding device adapted more particularly to rigidly support stakes located about the edge of a vehicle-body to retain a load in position thereon, and the object of this invention is to so construct a stake-holder of this character that it may be firmly secured to the framework of a vehicle so as not to become loosened by any strain which may be brought to bear upon the stakes supported thereon.

A still further object of the invention is to provide flanges on the tubular body portion of this holder and so arrange these flanges that bolts may be passed therethrough to not only secure the holder in position to the frame but also to secure the intersecting members of the frame together at the holder.

A still further object of the invention is to provide a hook on the device for engaging a loop or bight of the rope used for lashing a load to the vehicle.

With these and other objects in view, the invention consists of certain novel features of construction, as will be more fully described, and particularly pointed out in the appended claims.

In the accompanying drawings:

Figure 1 is a sectional side elevation of the preferred form of my improved stake-holder, illustrating the intersecting frame portions in dotted lines as bolted together through the stake-holder flanges.

Fig. 2 is a plan view of my improved stake-holder.

Fig. 3 is a perspective view of the holder bolted to the sill of a vehicle frame.

Fig. 4 is a perspective view of my improved stake holder, a portion being broken away to better illustrate the relative arrangement of the securing flanges.

Fig. 5 shows a modified construction of my improved stake-holder, showing the flanges arranged more particularly to engage the sill of the body when the same is constructed of angle iron, the latter being shown in dotted lines.

Fig. 6 is another view of this modified construction of stake-holder, illustrating the same as bolted to the longitudinal sill and beam and also to the transverse tie-beams of a vehicle frame.

It is found in the ordinary stake-holding devices that the same have no provision for being securely bolted to the frame or body of a vehicle and therefore, they quickly become loosened by heavy strains and rough usage they are called upon to withstand and the stakes are permitted to flop in all directions and the holder finally breaks off and the stakes are lost.

To obviate this difficulty I have provided a stake holder which is adapted to perform the function of not only firmly and securely supporting the stakes in desired position but to resist all strains and rough usages, and at the same time have its flanges so arranged as to serve as binding plates through which the frame members of a vehicle may be securely fastened at their intersecting points to bind the whole together: And the following is a detailed description of a construction of holder by which this result may be satisfactorily accomplished.

With reference to the drawings, 10 designates the rectangular socket member of my improved stake-holder, which is designed to set in a vertical position and receive the lower end of the load-supporting stake 11. This socket member is provided with a horizontally-disposed flange 12 located a short distance below the upper end of the stake pocket.

In my prefered form this flange extends around both sides of the stake pocket as at 13 and also inwardly as at 14 from the inner edge of the stake pocket, and beneath this inwardly-extending portion of the flange I have provided two parallel spaced apart vertically-disposed flanges or walls forming a pocket into which the end of the transverse beam 16 extends and is secured by the bolts 17.

By placing this flange 12 a short distance below the upper edge of the stake-tube, a longitudinal running board or sill 18 may be positioned to rest upon the flange and be secured thereto by means of bolts 19 and this sill may also be secured to the transverse beam 16 below by means of another bolt 20 passing through the sill, through the flange 14 and through the transverse beam 16.

It is also found in practice to be of advantage to provide a hook-shaped attaching member 21 to the lower edge of one or both of the vertical flanges 15 to engage a rope or cord employed for binding the load to the body of the vehicle.

In some cases where the sills are in the shape of a lengthwise extending beam, as illustrated in Figs. 5 and 6, it is found advisable to swing the downwardly-extending flange to either side of the stake-receiving pocket 22 as at 23, and to also provide an inwardly-extending, longitudinally-disposed flange 24 on said pocket 22 whereby this device may be set up against the downwardly-extending flange portion of an angle iron 25, as illustrated in Fig. 5, or against the outer face of a lengthwise extending beam 26 if desired, in either of which cases bolts 27 may be passed through the downwardly-extending flanges 23 into the beam to secure the stake-holder thereto. In this case a sill-plate 28 may extend along and rest upon the upper surface of the flange 24 and be bolted down through this flange into the beam below by means of bolts 29.

This style of stake-holder may also be provided with an inturned hook 30 formed on the lower edge of its tubular stake-receiving member.

My improved stake-holder is so constructed that it may be most rigidly secured to the frame of a vehicle so that it cannot possibly become loosened therefrom and to withstand all of the severe strains which may be brought to bear upon the stakes by the load in the body, and in addition to this the flanges are so arranged as to assist in the binding of the intersecting portions of the frame together where the holders are located.

The foregoing description is directed solely toward the construction illustrated, but I desire it to be understood that I reserve the privilege of resorting to all the mechanical changes to which the device is susceptible, the invention being defined and limited only by the terms of the appended claims.

I claim:

1. A stake holder comprising a vertically-disposed stake receiving tubular socket member having a horizontally disposed laterally-extending flange located adjacent its upper end, a vertically-disposed flange positioned to coöperate with said horizontal flange and by which the device may be securely bolted to the frame of a vehicle, and a hook formed on the lower edge of said device for engaging a load-binding rope.

2. A stake holder comprising a vertically-disposed stake-receiving tubular socket member having a horizontally-disposed laterally-extending flange, a pair of spaced apart vertically-disposed flanges beneath said horizontal flanges forming a pocket for the reception of a beam end, said flanges coöperating to provide means whereby the device may be rigidly bolted to a vehicle frame, and an inwardly turned hook formed integral with the lower edge of the device for engaging a load-binding rope.

In testimony whereof I affix my signature.

THOMAS F. CULLINAN.